US012774002B1

(12) United States Patent
Davis et al.

(10) Patent No.: US 12,774,002 B1
(45) Date of Patent: Oct. 27, 2026

(54) TRAILER LOAD MONITORING AND NOTIFICATION SYSTEM

(71) Applicant: Torc Robotics, Inc., Blacksburg, VA (US)

(72) Inventors: William Gray Davis, Austin, TX (US); Manan Bhatt, Austin, TX (US); Joseph R. Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 84 days.

(21) Appl. No.: 18/900,312

(22) Filed: Sep. 27, 2024

(51) Int. Cl.
*B60W 40/13* (2012.01)

(52) U.S. Cl.
CPC ..... *B60W 40/13* (2013.01); *B60W 2040/1315* (2013.01); *B60W 2300/14* (2013.01); *B60W 2530/10* (2013.01)

(58) Field of Classification Search
None
See application file for complete search history.

(56) References Cited

U.S. PATENT DOCUMENTS 4,728,922 A 3/1988 Christen et al.
6,203,045 B1 3/2001 Kyrtsos et al.
6,459,367 B1 10/2002 Green et al.
8,103,414 B2 1/2012 Boss et al.
8,890,670 B2 11/2014 Brey et al.
10,300,928 B2 5/2019 Trageser
10,311,315 B2 6/2019 Drazan et al.
10,899,323 B2 * 1/2021 Switkes .............. B60W 30/165
11,125,640 B2 9/2021 Jensen et al.
11,263,838 B2 3/2022 Patnaik
11,441,937 B2 9/2022 Zhang et al.
11,458,794 B2 10/2022 Coombs
11,580,484 B2 2/2023 Patnaik et al.
11,787,418 B1 10/2023 Gudeta et al.
11,873,008 B2 1/2024 Ravella et al.
2017/0254694 A1 9/2017 Toigo
2022/0176959 A1 * 6/2022 Katsuki .................... G01G 9/00
2022/0185397 A1 6/2022 Söder et al.
2023/0123587 A1 * 4/2023 Jatt ....................... B60W 30/06
701/23

(Continued)

*Primary Examiner* — Peter D Nolan
*Assistant Examiner* — Jacob Kent Besteman-Street
(74) *Attorney, Agent, or Firm* — Armstrong Teasdale LLP

(57) ABSTRACT

An autonomous vehicle selectively coupled to a load includes a sensor configured to capture signals of an autonomous vehicle and an autonomy computing system operably coupled to the sensor including a memory device and a processor programmed to receive the signals from the sensor as the autonomous vehicle coupled to the load is executing a driving maneuver, determine, using the received signals, a center of mass defined by the load, determine, based on the center of mass, a weight-on-axle for each axle of a plurality of axles supporting the vehicle and the load, determine if the weight-on-axle for each axle exceeds predetermined maximum weight-on-axle values to determine if the center of mass requires adjustment, and issue a recommendation for adjusting the center of mass to cause the weight-on-axle for each axle to be less than the predetermined maximum weight-on-axle values before weighing the vehicle and the load on a scale.

19 Claims, 9 Drawing Sheets

(56) References Cited

U.S. PATENT DOCUMENTS

| | | | | |
|---|---|---|---|---|
| 2023/0134200 | A1* | 5/2023 | Latimer | B60W 40/13<br>701/124 |
| 2023/0273065 | A1 | 8/2023 | Sellhusen et al. | |
| 2023/0332906 | A1* | 10/2023 | Shchelkanov | G01C 21/3461 |
| 2023/0373468 | A1* | 11/2023 | Tagawa | B60W 30/04 |
| 2024/0066985 | A1 | 2/2024 | Tagawa et al. | |
| 2025/0018942 | A1* | 1/2025 | Suzuki | B60W 10/20 |

* cited by examiner

TRAILER LOAD MONITORING AND NOTIFICATION SYSTEM

TECHNICAL FIELD

The field of the disclosure relates generally to autonomous vehicles and, more specifically, monitoring autonomous vehicle tailer load distribution.

BACKGROUND OF THE INVENTION

Commercial vehicles, such as those used in the trucking industry, haul heavy loads which are often carried in a detachable trailer. As can be appreciated, the placement and distribution of the load within the trailer may significantly impact the stability of the trailer and hinder the ability of the tractor to safely haul the load. Weighing a fully loaded tractor-trailer (e.g., a rig) to determine whether its mass distribution is within legal limits is an onerous and time-consuming task. If the weight is illegally distributed, a rig goes to the back of the line and must be re-weighed after rearranging the load. Currently, this process is largely guess-and-check, leading to unnecessary losses of both time and money. Additionally, loads within the trailer may shift or otherwise move within the trailer causing the previously determined safe load distribution to become unsafe. For an autonomous vehicle, with the absence of a driver, it is difficult or otherwise impossible to identify the load shift and subsequent unsafe conditions.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In accordance with an aspect of the disclosure, an autonomous vehicle selectively coupled to a load includes at least one sensor configured to capture signals of an autonomous vehicle and an autonomy computing system operably coupled to the at least one sensor, the autonomy computing system including at least one processor and at least one memory device, the at least one processor programmed to receive the signals from the at least one sensor as the autonomous vehicle coupled to the load is executing a driving maneuver, determine, using the signals received from the at least one sensor, a center of mass defined by the load coupled to the vehicle, determine, based on the determined center of mass, a weight-on-axle for each axle of a plurality of axles supporting the vehicle and the load, determine if the determined weight-on-axle for each axle exceeds predetermined maximum weight-on-axle values to determine if the center of mass requires adjustment, and issue a recommendation for adjusting the center of mass to cause the weight-on-axle for each axle to be less than the predetermined maximum weight-on-axle values before weighing the vehicle and the load on the scale.

In aspects, the at least one processor may be further programmed to determine a total mass of the load based on the signals received from the at least one sensor as the autonomous vehicle coupled to the load is executing the driving maneuver.

In other aspects, the vehicle may further include a fifth wheel hitch configured to selectively engage and support the load on the autonomous vehicle.

In certain aspects, the at least one processor may be further programmed to determine, if the center of mass of the load requires adjustment, a position of the fifth wheel hitch on the autonomous vehicle that causes the weight-on-axle of each axle of the plurality of axles to be less than the predetermined maximum weight-on-axle values before weighing the autonomous vehicle and the load on the scale.

In other aspects, the fifth wheel hitch may be selectively adjustable relative to the autonomous vehicle, wherein the at least one processor is further programmed to adjust the fifth wheel hitch to the determined position on the autonomous vehicle.

In aspects, the at least one processor may be further programmed to issue an alert including a recommendation for the determined position of the fifth wheel hitch on the autonomous vehicle.

In certain aspects, the at least one processor may be further programmed to determine a type of load coupled to the autonomous vehicle based on the signals received from the at least one sensor as the autonomous vehicle coupled to the load is executing the driving maneuver.

In aspects, the at least one processor may be further programmed to determine, if the total mass of the load that is supported by the autonomous vehicle requires adjustment, a recommended redistribution of a cargo of the load that causes the weight-on-axle of each of the plurality of axles to be less than the predetermined maximum weight-on-axle values.

In other aspects, the at least one processor may be further programmed to determine, if the total mass of the load that is supported by the autonomous vehicle requires adjustment, a recommended reduction in a mass of the load that causes the weight-on-axle of each of the plurality of axles to be less than the predetermined maximum weight-on-axle values.

In aspects, the axle supporting the load may be selectively adjustable relative to the load, wherein the at least one processor is further programmed to determine, if the center of mass of the load requires adjustment, a position of the axle supporting the load that causes the weight-on-axle of each axle of the plurality of axles to be less than the predetermined maximum weight-on-axle values before weighing the autonomous vehicle and the load on the scale.

In accordance with another aspect of the disclosure, a computer-implemented method of monitoring a trailer load of an autonomous vehicle includes performing a driving maneuver with an autonomous vehicle coupled to a load, wherein the autonomous vehicle coupled to the load includes a plurality of axles, receiving signals from at least one sensor of the autonomous vehicle as the autonomous vehicle is performing the driving maneuver, determining, using the received signals, a center of mass defined by the load coupled to the autonomous vehicle, determining, based on the determined center of mass, a weight-on-axle for each axle of the plurality of axles, determining if the determined weight-on-axle for each axle exceeds predetermined maximum weight-on-axle values to determine if the center of mass requires adjustment, and issue a recommendation for adjusting the center of mass to cause the weight-on-axle for each axle to be less than the predetermined maximum weight-on-axle values before weighing the vehicle and the load on a scale.

In other aspects, the computer-implemented method may include determining a total mass of the load based on the received signals as the autonomous vehicle coupled to the load is executing the driving maneuver.

In certain aspects, performing the driving maneuver may include performing the driving maneuver with the load selectively engaged with and supported by a fifth wheel hitch of the autonomous vehicle.

In aspects, the computer-implemented method may include determining, if the center of mass requires adjustment, a position of the fifth wheel hitch on the autonomous vehicle that causes the weight-on-axle of each axle of the plurality of axles to be less than the predetermined maximum weight-on-axle values before weighing the autonomous vehicle and the load on the scale.

In certain aspects, the computer-implemented method may include adjusting the fifth wheel hitch to the determined position on the autonomous vehicle.

In other aspects, the computer-implemented method may include issuing an alert including a recommendation for the determined position of the fifth wheel hitch on the autonomous vehicle.

In aspects, the computer-implemented method may include determining a type of load coupled to the autonomous vehicle based on the received signals as the autonomous vehicle coupled to the load is executing the driving maneuver.

In other aspects, the computer-implemented method may include determining, if the total mass of the load that is supported by the autonomous vehicle requires adjustment, a recommended redistribution of a cargo of the load that causes the weight-on-axle of each of the plurality of axles to be less than the predetermined maximum weight-on-axle values.

In certain aspects, the computer-implemented method may include determining, if the total mass of the load that is supported by the autonomous vehicle requires adjustment, a recommended reduction in a mass of the load that causes the weight-on-axle of each of the plurality of axles to be less than the predetermined maximum weight-on-axle values.

In aspects, the computer-implemented method may include determining, if the center of mass of the load requires adjustment, a position of an axle off the plurality of axles supporting the load that causes the weight-on-axle of each axle to be less than the predetermined maximum weight-on-axle values before weighing the autonomous vehicle and the load on the scale.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
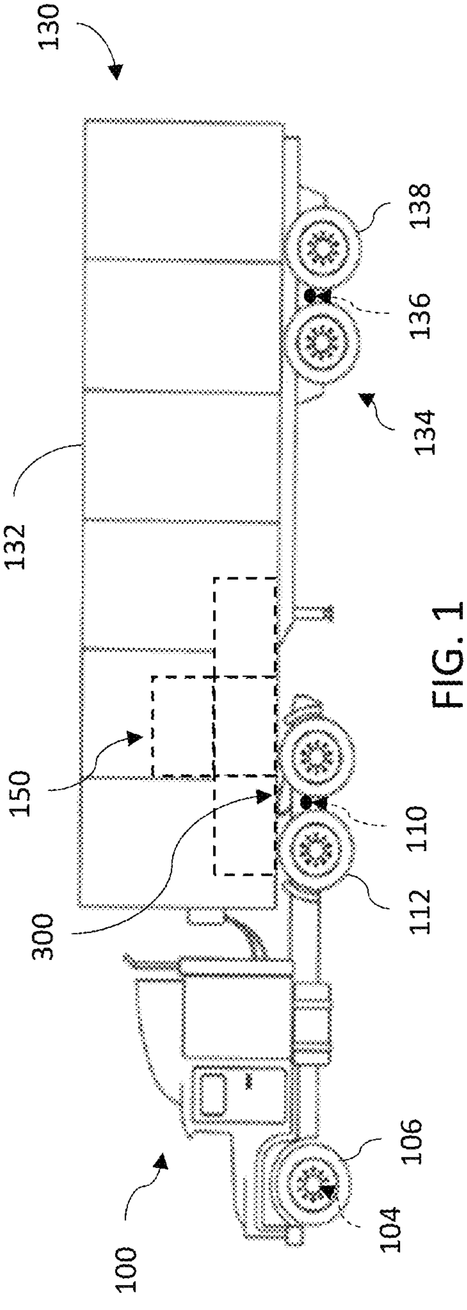
FIG. 1 is an elevation view of a rig in accordance with the disclosure including a vehicle and a trailer.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

The disclosure is directed to systems and methods for monitoring and notifying autonomous vehicle trailer load distribution in an autonomous vehicle. The autonomy computing system described herein determines a total wheelbase of the rig and a wheelbase of the trailer based on identified positions of a fifth wheel hitch coupled to the vehicle and a trailer axle assembly coupled to the trailer. The portion of the total mass of the trailer supported by each of the vehicle (e.g., at the fifth wheel hitch) and the trailer (e.g., at the trailer axle) is determined, and using the predetermined mass density distribution of the vehicle, a weight-on-axle is determined for each axle of the rig. The determined weight-on-axle of each axle of the rig is compared to predetermined maximum weight-on-axle values associated with the type of vehicle and the type of trailer making up the rig. If one or more weight-on-axle values exceed the predetermined maximum weight-on-axle values, an alert is issued and the computing system determines if the position of one or both of the fifth wheel hitch or the trailer axle assembly may be adjusted to satisfy the predetermined maximum weight-on-axle values. If it is not possible to correct the weight-on-axle values using the fifth wheel hitch and/or the trailer axle assembly, the computing system determines a recommendation for redistributing the cargo within the trailer to satisfy the predetermined maximum weight-on-axle values. If a solution exists where weight-on-axle for each of the axles of the rig may fall below the predetermined maximum weight-on-axle values, instructions for manually adjusting the fifth wheel hitch and/or the trailer axle assembly to new positions are issued. In embodiments, the computing system may automate adjustment of the fifth wheel hitch and/or the trailer axle assembly without external intervention. If it is determined that the weight-on-axle on one or more of each axle of the rig exceeds the predetermined maximum weight-on-axle values, the computing system determines if the total mass of the rig exceeds a predetermined maximum weight value. If the total mass of the rig exceeds the predetermined maximum weight value, an alert is issued and a recommendation is generated for an amount of cargo that must be removed from the trailer to satisfy the predetermined maximum weigh value.

Figure 2:
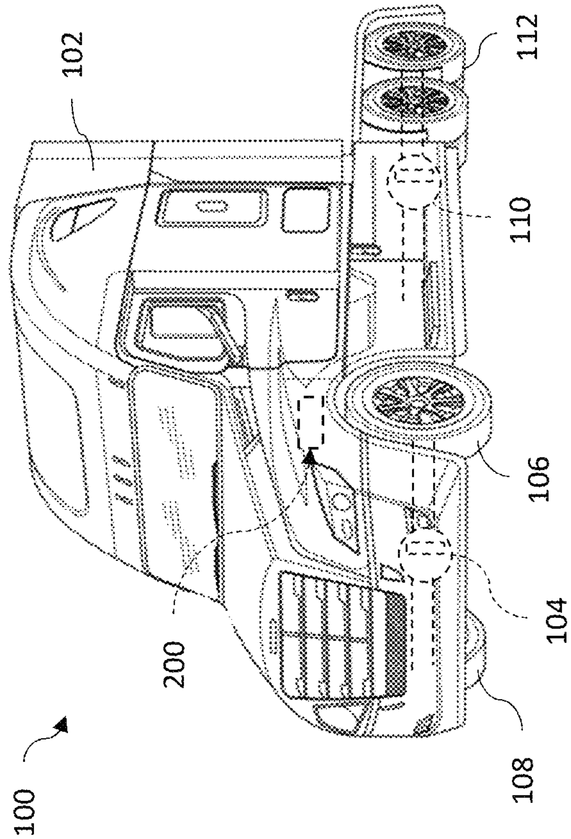
FIG. 2 is a perspective view of the vehicle of the rig of FIG. 1.

Turning now to the drawings, FIG. 1 illustrates a vehicle in accordance with the disclosure generally identified by reference numeral 100. The vehicle 100 may be a truck, which in embodiments, may form part of a rig 130 by being conventionally connected to a single or tandem trailer 132 to transport the trailer 132 to a desired location. With additional reference to FIG. 2, the vehicle 100 includes a cab 102 that may be supported, and steered in, the required direction by a front or first axle 104 having front wheels 106 and 108, and a second or rear axle 110 having rear wheels 112 that are partially shown in FIG. 2. As can be appreciated, the rear wheels 112 of the autonomous vehicle 100 may be operably coupled to any number of axles without departing from the scope of the disclosure. In one non-limiting embodiment, the rear wheels 112 are operably coupled to two axles, where the rear axle 110 is defined generally as a midpoint between each of the two axles. The front wheels 106, 108 are positioned by a steering system that includes a steering wheel and a steering column (not shown). The steering wheel and the steering column may be located in the interior of the cab 102. It is envisioned that the vehicle 100 may be an autonomous vehicle that may be operated by an autonomy computing system 200 (See FIG. 5, described later) based on data collected by a sensor network including one or more sensors. As can be appreciated, the steering wheel and the steering column, and all or parts of the cab 102, may be omitted in an autonomous vehicle.

With continued reference to FIG. 1, the trailer 132 of the rig 130 includes a trailer wheel assembly 134 defining a trailer axle 136. As can be appreciated, the trailer wheel assembly 134 of the trailer 132 may include any suitable number of wheels 138 operably coupled to any suitable number of axles without departing from the scope of the disclosure. In one non-limiting embodiment, the trailer wheel assembly 134 includes two axles, where a trailer axle 136 is defined at a generally midpoint position between the two axles. In embodiments, the trailer wheel assembly 134 may be adjustable to alter a mass distribution of the trailer 132. It is envisioned that the trailer 132 may be any type of trailer suitable for use with the autonomous vehicle or tractor 100 and is configured to carry or otherwise support a load or cargo 150. In embodiments, the trailer 132 may be a dry van trailer, a flatbed trailer, a refrigerated trailer, a drop-deck trailer, amongst others.

Figure 3:
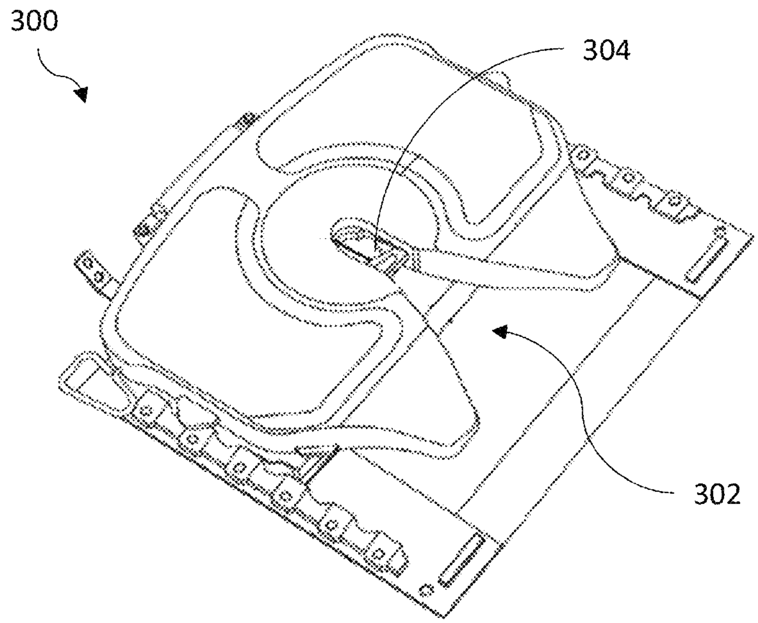
FIG. 3 is a perspective view of a fifth wheel hitch of the vehicle of FIG. 2.
Figure 4:
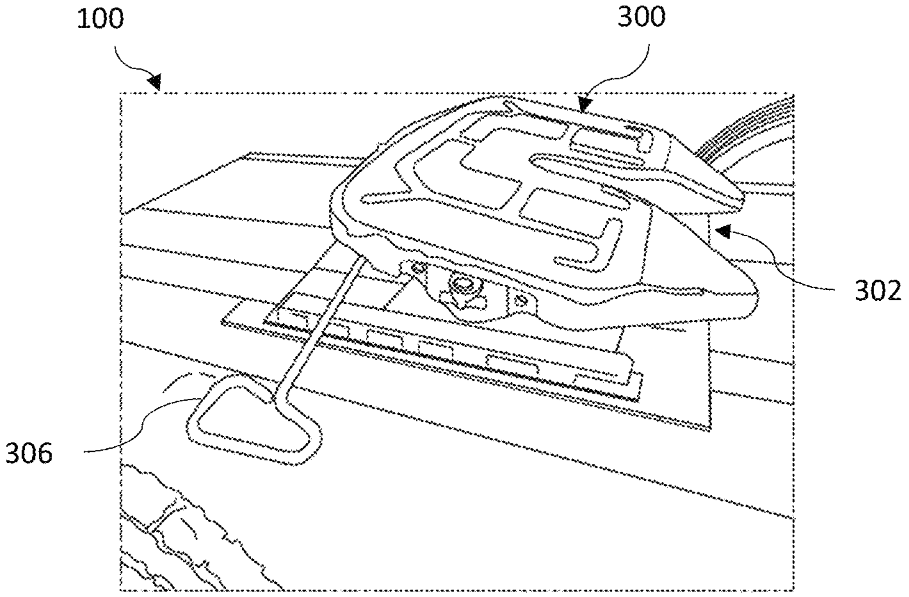
FIG. 4 is a perspective view of the fifth wheel hitch of FIG. 3 shown coupled to the vehicle of FIG. 2.
Figure 8:
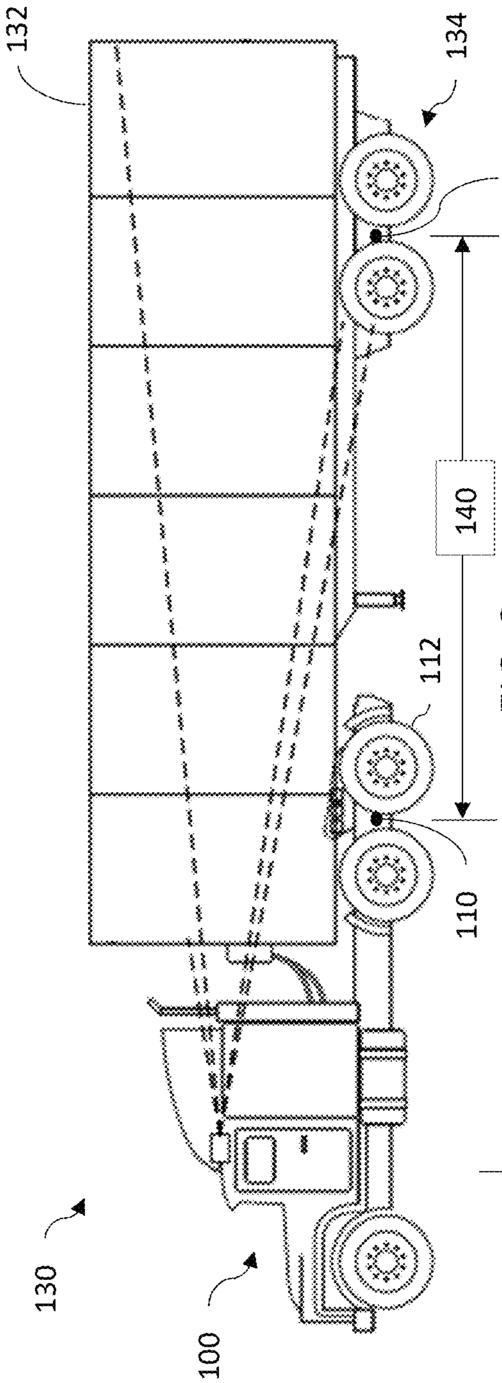
FIG. 8 is an elevation view of the rig of FIG. 1 illustrating the autonomous vehicle system of FIG. 5 identifying characteristics of the trailer of FIG. 1.

With additional reference to FIGS. 3 and 4, the vehicle 100 includes a fifth-wheel hitch 300 that is longitudinally adjustable along a centerline of the autonomous vehicle 100 to selectively alter a wheelbase 144 (See FIGS. 8 and 9, described later) of the rig 130 and thereby the weight-on-axle loading of the rig 130. The fifth-wheel hitch 300 is operably coupled to the autonomous vehicle 100 at a position that is generally above the rear axle 110 (e.g., in a direction extending from a surface supporting the autonomous vehicle 100). The fifth-wheel hitch 300 defines a throat 302 having a pair of locking jaws 304 configured to selectively receive and engage a coupling unit or trailer kingpin 140 (See FIGS. 8 and 9, described later) of the trailer 132 and selectively couple the trailer 132 to the autonomous vehicle 100. It is envisioned that the pair of locking jaws 304 may be manually operated or automatically operated via the autonomy computing system 200. It is envisioned that the longitudinal position of the fifth-wheel hitch 300 may be selectively locked and unlocked manually, via a handle, lever, or other suitable device 306, or automatically by the autonomy computing system 200 via an air release (not shown), electrically operated switch (not shown), etc., or combinations thereof. The autonomy computing system 200 may instruct or otherwise autonomously control operation of the autonomous vehicle 100 to drive the autonomous 100 forward or backward until the fifth-wheel hitch 300 is in a desired position or in embodiments, may control the longitudinal position of the fifth-wheel hitch 300 pneumatically, mechanically, electromechanically, etc. The autonomy computing system 200 monitors or otherwise determines the longitudinal position of the fifth-wheel hitch 300, or in embodiments, the trailer kingpin 140, via one or more sensors of the sensors 202. For a detailed description of exemplary fifth-wheel hitches and automated management thereof, reference can be made to U.S. patent application Ser. No. 18/235,330 by Fox-Rabinovitz et al., filed on Aug. 17, 2023, the entire content of which is hereby incorporated by reference herein.

Figure 5:
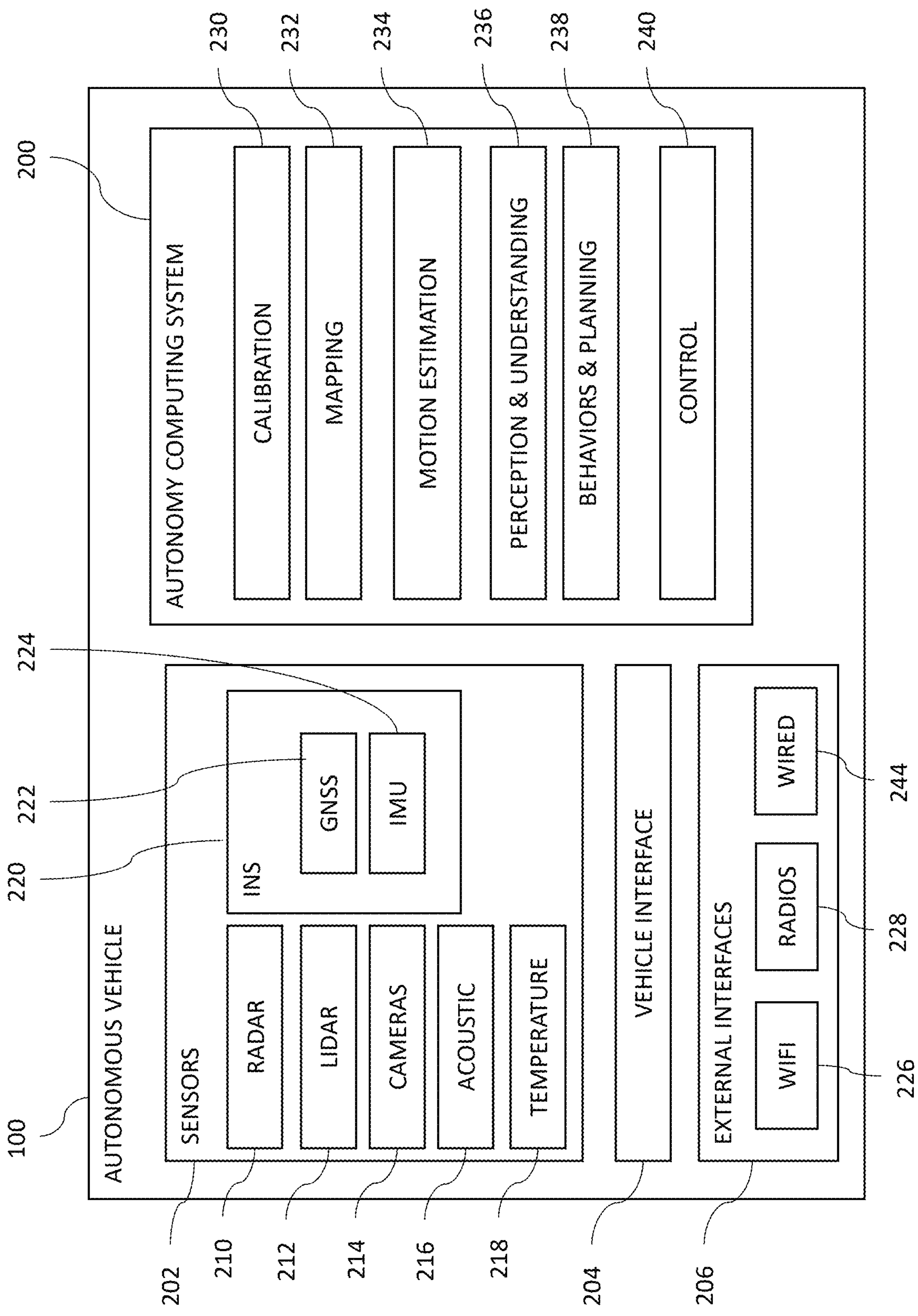
FIG. 5 is a block diagram of an autonomous vehicle system in accordance with the disclosure.

With reference to FIG. 5, a block diagram of the autonomous vehicle 100 is illustrated. In the example embodiments, the autonomous vehicle 100 includes the autonomy computing system 200, sensors 202, a vehicle interface 204, and external interfaces 206. In the example embodiment, the sensors 202 may include various sensors such as, for example, radio detection and ranging (RADAR) sensors 210, light detection and ranging (LiDAR) sensors 212, cameras 214, acoustic sensors 216, temperature sensors 218, or an inertial navigation system (INS) 220, which may include one or more global navigation satellite system (GNSS) receivers 222 and one or more inertial measurement units (IMU) 224. Other sensors 202 not shown in FIG. 3 may include, for example, acoustic (e.g., ultrasound), internal vehicle sensors, meteorological sensors, or other types of sensors. The sensors 202 generate respective output signals based on detected physical conditions of the autonomous vehicle 100 and its proximity. As described in further detail below, these signals may be used by the autonomy computing system 200 to determine how to control operation of the autonomous vehicle 100.

The cameras 214 are configured to capture images of the environment surrounding the autonomous vehicle 100 in any aspect or field of view (FOV). The FOV may have any angle or aspect such that images of the areas ahead of, to the side of, behind, above, or below the autonomous vehicle 100 may be captured. In some embodiments, the FOV may be limited to particular areas around the autonomous vehicle 100 (e.g., forward of the autonomous vehicle 100, to the sides of the autonomous vehicle 100, etc.) or may surround 360 degrees of the autonomous vehicle 100. In some embodiments, the autonomous vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding the autonomous vehicle 100. In some embodiments, the image data generated by the cameras 214 may be sent to the autonomy computing system 200 or other aspects of the autonomous vehicle 100, and this image data may include the autonomous vehicle 100 or a generated representation of the autonomous vehicle 100. In some embodiments, one or more systems or components of the autonomy computing system 200 may overlay labels to the features depicted in the image data, such as on a raster layer or other semantic layer of a high-definition (HD) map.

The LiDAR sensors 212 generally include a laser generator and a detector that send and receive a LiDAR signal such that LiDAR point clouds (or "LiDAR images") of the areas ahead of, to the side of, behind, above, or below the autonomous vehicle 100 may be captured and represented in the LiDAR point clouds. The radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from the cameras 214, the radar sensors 210, or the LiDAR sensors 212 may be fused or used in combination to determine conditions (e.g., locations of other objects) around the autonomous vehicle 100.

With continued reference to FIG. 5, the GNSS receiver 222 is positioned on the autonomous vehicle 100 and may be configured to determine a location of the autonomous vehicle 100, which may be embodied as GNSS data, as described herein. The GNSS receiver 222 may be configured to receive one or more signals from a global navigation satellite system (e.g., Global Positioning System (GPS) constellation) to localize the autonomous vehicle 100 via geolocation. In some embodiments, the GNSS receiver 222 may provide an input to or be configured to interact with, update, or otherwise utilize one or more digital maps, such as an HD map (e.g., in a raster layer or other semantic map). In some embodiments, the GNSS receiver 222 may provide direct velocity measurement via inspection of the Doppler effect on the signal carrier wave. It is envisioned that multiple GNSS receivers 222 may also provide direct measurements of the orientation of the autonomous vehicle 100. For example, with two GNSS receivers 222, two attitude angles (e.g., roll and yaw) may be measured or determined. In some embodiments, the autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about the autonomous vehicle 100 and its environment.

The IMU 224 is a micro-electrical-mechanical (MEMS) device that measures and reports one or more features regarding the motion of the autonomous vehicle 100, although other implementations are contemplated, such as mechanical, fiber-optic gyro (FOG), or FOG-on-chip (SiFOG) devices. The IMU 224 may measure an acceleration, an angular rate, and/or an orientation of the autonomous vehicle 100 or one or more of its individual components using a combination of accelerometers, gyroscopes, or magnetometers. The IMU 224 may detect linear acceleration using one or more accelerometers and rotational rate using one or more gyroscopes and attitude information from one or more magnetometers. In some embodiments, the IMU 224 may be communicatively coupled to one or more other systems, for example, the GNSS receiver 222 and may provide input to and receive output from the GNSS receiver 222 such that the autonomy computing system 200 is able to determine the motive characteristics (e.g., acceleration, speed/direction, orientation/attitude, etc.) of the autonomous vehicle 100.

In the example embodiment, the autonomy computing system 200 employs the vehicle interface 204 to send commands to the various aspects of the autonomous vehicle 100 that actually control the motion of the autonomous vehicle 100 (e.g., engine, throttle, steering wheel, brakes, etc.) and to receive input data from one or more of the sensors 202 (e.g., internal sensors). The external interfaces 206 are configured to enable the autonomous vehicle 100 to communicate with an external network via, for example, a wired connection 244 (e.g., Ethernet, USB, Serial, etc.) or wireless connection, such as Wi-Fi 226 or other radios 228. In embodiments including a wireless connection, the connection may be a wireless communication signal (e.g., Wi-Fi, cellular, LTE, 5g, Bluetooth, etc.).

With continued reference to FIG. 5, in some embodiments, the external interfaces 206 may be configured to communicate with an external network via the wired connection 244, such as, for example, during testing of the autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by the autonomous vehicle 100 to navigate or otherwise operate, either autonomously or semi-autonomously. The digital files, executable programs, and other computer readable code may be stored locally or remotely and may be routinely updated (e.g., automatically or manually) via the external interfaces 206 or updated on demand. In some embodiments, the autonomous vehicle 100 may deploy with all of the data it needs to complete a mission (e.g., perception, localization, and mission planning) and may not utilize a wireless connection or other connection while underway.

In the example embodiment, the autonomy computing system 200 is implemented by one or more processors and memory devices of the autonomous vehicle 100. Autonomy computing system 200 includes modules, which may be hardware components (e.g., processors or other circuits) or software components (e.g., computer applications or processes executable by the autonomy computing system 200), configured to generate outputs, such as control signals, based on inputs received from, for example, the sensors 202. These modules may include, for example, a calibration module 230, a mapping module 232, a motion estimation module 234, a perception and understanding module 236, a behaviors and planning module 238, and a control module or controller 240. These modules may be implemented in dedicated hardware such as, for example, an application specific integrated circuit (ASIC), a field programmable gate array (FPGA), or a microprocessor, or implemented as executable software modules, or firmware, written to memory and executed on one or more processors onboard the autonomous vehicle 100.

It is envisioned that the autonomy computing system 200 of the autonomous vehicle 100 may be completely autonomous (fully autonomous) or semi-autonomous. In one example, the autonomy computing system 200 may operate under Level 5 autonomy (e.g., for example, full driving automation), Level 4 autonomy (e.g., for example, high driving automation), or Level 3 autonomy (e.g., for example, conditional driving automation). As used herein the term "autonomous" includes both fully autonomous and semi-autonomous.

Returning to FIGS. 1-4 and with additional reference to FIGS. 6-11, as can be appreciated, after loading the trailer 132 with cargo 150 and prior to embarking on a journey to deliver the cargo 150, the rig 130 must be weighed to ensure that the mass distribution of the rig 130 is within legal limits. This process may be a time consuming and onerous task, especially so in instances where the transportation company is restricted from touching the cargo 150 loaded within the trailer 132. To adjust the mass distribution of the rig 130, the fifth-wheel hitch 300 of the autonomous vehicle 100, and in embodiments, the trailer wheel assembly 134 of the trailer 132, may be adjusted without physically touching the cargo 150 to alter a wheelbase 144 of the rig 130 or wheelbase 140 of the trailer 132, and therefore, alter the loading imparted to the autonomous vehicle 100 by the trailer 132. However, if no position of the fifth-wheel hitch 300 or the trailer wheel assembly 134 produces a valid, legal solution, the owners of the cargo 150 need to be informed to rearrange the cargo 150 within the trailer 132. Additionally, each possible arrangement of the cargo 150 within the trailer 132 leads to a different longitudinal moment of inertia, resulting in different inputs to the autonomy computing system 200 while the autonomous vehicle 100 is driving.

In accordance with the disclosure, the autonomy computing system 200 determines if the identified weight-on-axle distribution of the loaded rig 130 is (1) legal, in which case no further action is needed, (2) nearly legal and within the adjustment limits of the fifth-wheel hitch 300, in which case the fifth-wheel hitch 300 is manually or automatically adjusted, (3) not legal and not within the adjustment limits of the fifth-wheel hitch 300, in which case the customer is notified and a recommendation for rearranging the cargo 150 is made, and (4) too heavy, in which case the customer is notified that the cargo 150 must be partially unloaded and a recommendation on the necessary weight reduction and subsequent mass distribution is made. Although generally described as having four results or scenarios, the disclosure is not so limited. It is envisioned that any number or combination of results or scenarios may be determined by the autonomy computing system 200 without departing from the scope of the disclosure.

Figure 6:
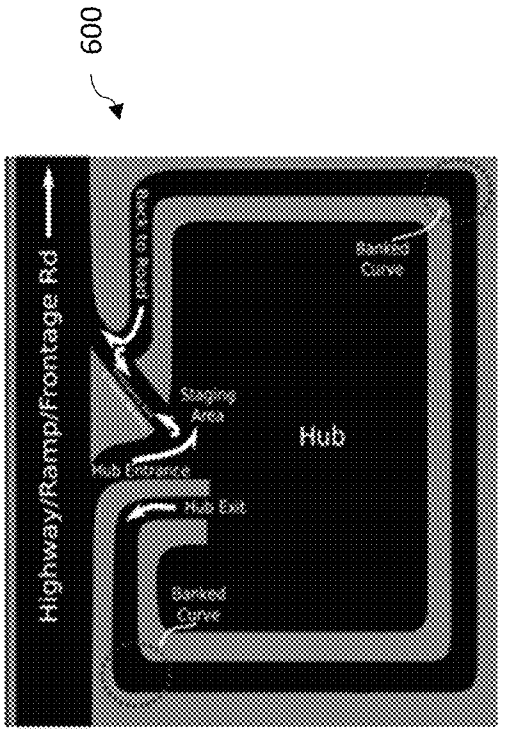
FIG. 6 is a topographical diagram of an autonomous vehicle hub in accordance with the disclosure.
Figure 7:
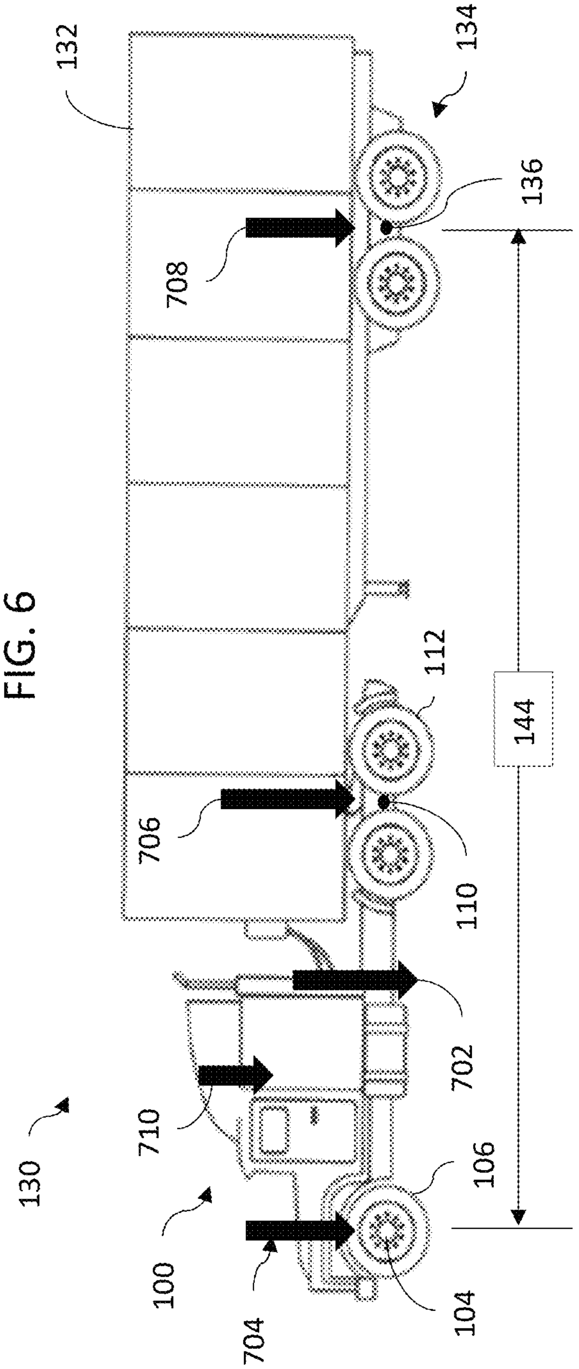
FIG. 7 is an elevation view of the rig of FIG. 1 illustrating a weight-on-axle of the rig.

The autonomy computing system 200 autonomously determines a weight-on-axle (e.g., an axle load) for each axle of the rig 130 (e.g., the autonomous vehicle 100 and the trailer 132) by performing a short driving maneuver around a hub, weight station, or parking lot 600 (FIG. 6). The hub 600 may include a designated pathway and/or traffic pattern that enables the autonomy computing system 200 to determine a weight-on-axle of the loaded rig 130, although the rig 130 may follow any path within or outside (e.g., for example, public or private roads, a parking lot, a truck stop, and combinations thereof) of the hub 600 without departing from the scope of the disclosure. Physical components and features of the hub 600 may be strategically placed within the environment of the hub 600, such as, for example, electronic signal exchanges, turns, inclines, road curvatures, stop signs, and combinations thereof. It is envisioned that the rig 130 may autonomously drive itself along a predetermined route by accessing stored and/or downloaded driving instructions, using visual cues (e.g., for example, machine readable codes) that are recognized by the rig 130 and guide it along the predetermined route, or combinations thereof. As can be appreciated, the autonomy computing system 200 may generate and/or access stored and/or downloaded driving instructions indicating the types of maneuvers required to determine the weight-on-axle, a speed of the rig 130 during the brief driving maneuver, a speed of the rig 130 about curves during the brief diving maneuver, and combinations thereof.

During the short driving maneuver, the autonomy computing system 200 may monitor data (e.g., engine torque, longitudinal motion, etc.) from a Control Area Network (CAN) bus associated with the autonomous vehicle 100 to determine a total mass of the rig 130, although it is contemplated that the autonomy computing system may calculate a total mass of the trailer 132 and a weight of the loaded trailer on the kingpin 140 of the trailer 132 without departing from the scope of the disclosure. In embodiments, the perception and understanding module 236 of the autonomy computing system 200, in cooperation with one or more of the sensors 202, the vehicle interface 204, and the external interface 206, may identify or otherwise determine a type, position, dimension, and/or other characteristics of the rig 130, the trailer 132, and/or the cargo 150 disposed within the trailer 132 before, during, and/or after the short driving maneuver. In this manner, the perception and understanding module 236 may determine an environment surrounding the autonomous vehicle 100 and detect a position and weight of the trailer 132 and/or a variable load of the autonomous vehicle 100. The perception and understanding module 236 monitors or otherwise maps the environment surrounding the autonomous vehicle 100 and may identify landmarks or other distinguishing features of the autonomous vehicle 100, the trailer 132, and/or the cargo 150 disposed within the trailer 132, such as a position of the fifth-wheel hitch 300, the position of the trailer axle 136, the presence or absence of a box (e.g., a dry van trailer), etc. It is envisioned that the perception and understanding module 236 may identify or otherwise determine a position of the fifth-wheel hitch 300 relative to the trailer axle 136 and determine a wheelbase 140 of the trailer 132. For a detailed description of exemplary systems and methods for identifying characteristics of a trailer and a surrounding environment, reference can be made to U.S. patent application Ser. No. 18/235,787 by Rivero et al., filed on Aug. 18, 2023, the entire content of which is hereby incorporated by reference herein.

The autonomy computing system 100 determines a total mass and mass density distribution (e.g., a center of mass 710) of the autonomous vehicle 100, from which the weight-on-axle for the rig 130 is derived. It is envisioned that the total mass and the mass density distribution of the autonomous vehicle 100 may be stored, retrieved, and/or processed by the autonomy computing system 200. The total mass, and therefore, the mass density distribution of the autonomous vehicle 100 may include, for example, an amount of fuel, occupants or passengers, extraneous cargo (e.g., personal belongings, provisions, etc.), etc. In embodiments, the autonomy computing system 200 may adjust, in real-time, variable loads on the autonomous vehicle 100, such as the mass of the fuel stored on the autonomous vehicle 100 or a mass disposed at a seating location within the autonomous vehicle 100. It is contemplated that the autonomy computing system 200 may update the total mass and the mass density distribution of the autonomous vehicle 100 in real-time based on the adjusted variable loads.

Figure 9:
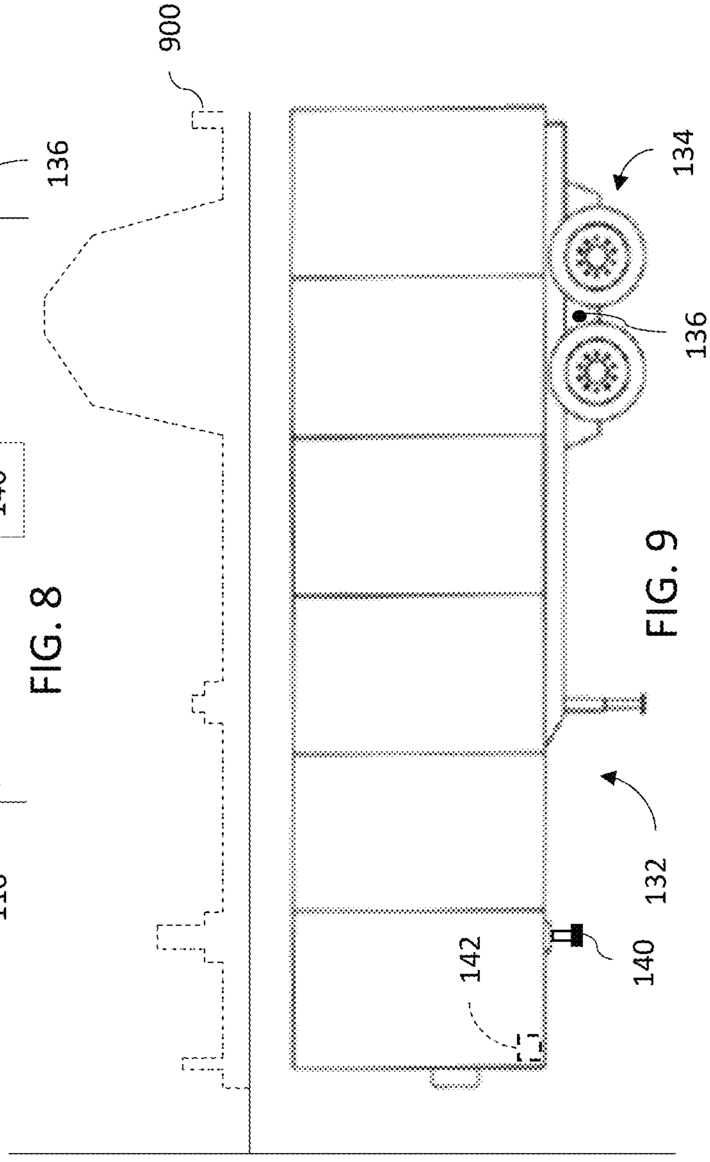
FIG. 9 is a mass density distribution diagram for the trailer of FIG. 1, shown in an unloaded condition.
Figure 10:
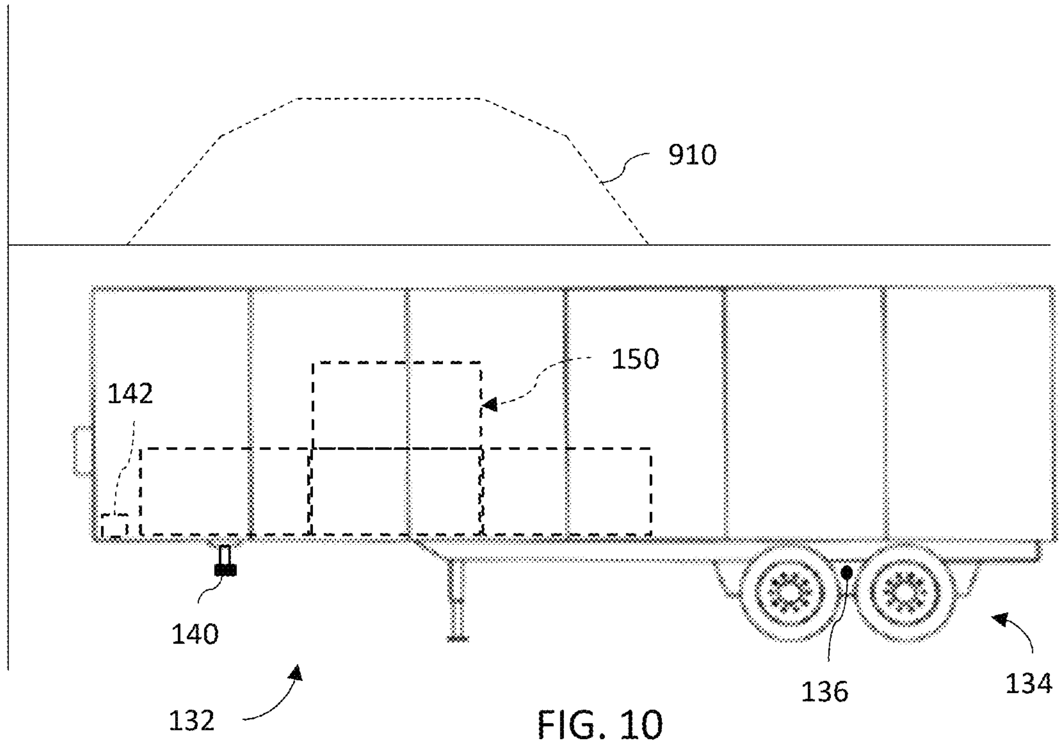
FIG. 10 is a mass density distribution diagram for a cargo loaded onto the trailer of FIG. 1.
Figure 11:
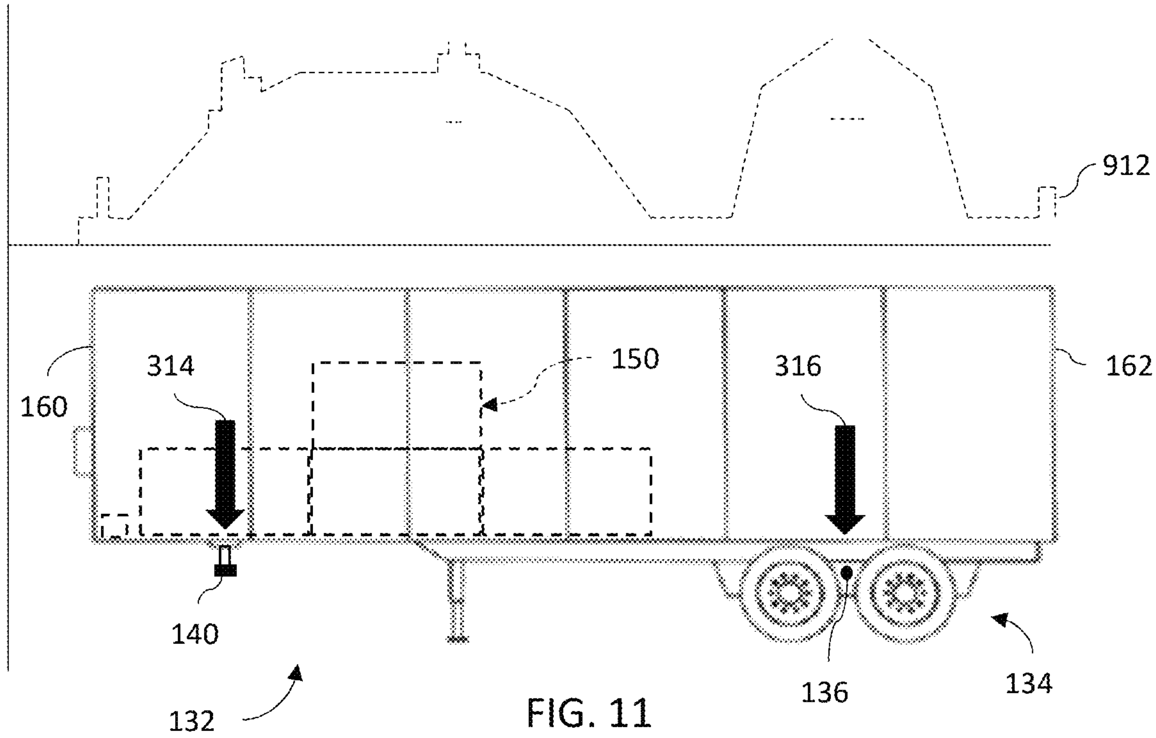
FIG. 11 is a total mass density distribution diagram for the trailer of FIG. 1, shown in a loaded condition.

With reference to FIGS. 9-11, characteristics of the cargo 150 loaded on the trailer 132 may be identified by determining or otherwise calculating an unloaded mass density distribution 900 of the trailer 132 when in an unloaded state (See FIG. 10) and a cargo mass density distribution 910 within the trailer 132 when in a loaded state (See FIG. 11). As can be appreciated, the position of the trailer wheel assembly 134 with respect to the kingpin 140 defines the wheelbase 138 of the trailer 132, and therefore, the unloaded mass density distribution 900 of the trailer 132. Using the calculated wheelbase 138 of the trailer 132 and detected features and/or characteristics of the trailer 132 (e.g., an unloaded mass of the trailer 132, the unloaded mass density distribution 900 of the trailer, the type of trailer, an existence of a box, a length of the box, a position of the trailer wheel assembly 134, more than one box, etc.), the autonomy computing system 200 determines the unloaded mass density distribution 900 of the trailer 132 (See FIG. 10). In embodiments, features and/or characteristics of various trailers and trailer types suitable for use with the autonomous vehicle 100 are stored on the autonomy computing system 200, on a device 142 disposed on or coupled to the trailer 132, on the external network, or combinations thereof. In this manner, the unloaded trailer mass density distribution 900 of the trailer 132 may be identified by correlating detected characteristics to stored trailer types or received or otherwise retrieved via wired or wireless communication from the device 142 of the trailer 132 or the external network. It is envisioned that the unloaded mass density distribution 900 of the trailer 132 may be determined while the trailer is in a loaded state (e.g., with cargo) or an unloaded state (e.g., without cargo) without departing from the scope of the disclosure.

With the type of trailer 132 identified and its unloaded mass density distribution 900 determined, the autonomy computing system 200 may determine the load mass density distribution 910 of the trailer 132 in the loaded state (See FIG. 10). As can be appreciated, the load mass density distribution 910 is dependent upon the load 150 disposed within the trailer 132 (e.g., palletized, bulk, liquid, etc.) and the method or mechanisms of securing the load 150 within the trailer 132, such as tie-downs, etc. It is envisioned that the load mass density distribution 910 may be automatically retrieved by the autonomy computing system 200 or may be determined using the autonomy computing system 200 via various loadings on support points, such as the trailer kingpin 140 and the trailer axle 136.

With the total mass of the trailer 132 in the loaded state and the load mass density distribution 910 determined, the unloaded mass density distribution 900 of the trailer 132 and the load mass density distribution 910 of the load disposed in the trailer may be combined or otherwise summed together to determine a combined total mass density distribution 912 of the trailer 132 (See FIG. 11). In embodiments, the total mass of the trailer 132 may be identified by integrating the aggregate mass density distribution 900 of the trailer 132 from a frontmost portion or front longitudinal extreme 160 ($x_f$) to a rearmost or rear longitudinal extreme 162 ($x_r$) of the aggregate mass density distribution 900 as follows:

$$m = \int_{x_f}^{x_r} \rho(x)dx \qquad \text{Equation 1}$$

The mass of the unloaded trailer 132, $m_{trailer}$ may be determined by subtracting a mass of the autonomous vehicle 100, occupants of the autonomous vehicle 100, and other variable loads (e.g., for example, fuel) associated with the trailer 132 from a total mass of the rig 130, which as described herein, may be determined using a CAN bus. A center of mass $x_c$ of the trailer 132 is a point at which the integral of the frontward and rearward mass density distributions are equal. In embodiments, the center of mass $x_c$ is interposed between the kingpin 140 and the rear axle 136, and may be expressed as either of:

$$\int_{x_f}^{x_r} (x - x_c)\rho(x)dx = 0;\ \text{or} \qquad \text{Equation 2}$$

$$x_c = \frac{1}{m}\int_{x_f}^{x_r} (x)\rho(x)dx \qquad \text{Equation 3}$$

A weight or mass applied at the kingpin 140 of the trailer may be measured and/or based on a strain gage (not shown) of the fifth wheel hitch 300. In embodiments, the mass applied at the kingpin 140 may be determined using the determined total mass density distribution 912. A weight or mass applied to the trailer axle 136 is also determined by the autonomy computing system 200 using the total mass density distribution 912 of the trailer 132. It is contemplated that the mass or load applied at the kingpin 140 may be described using a normalization factor N to normalize the mass on the kingpin 140 and the trailer axle 136. In embodiments, $m_0$ is the portion of the total mass of the trailer 132 on the kingpin 140 and $m_w$ is the portion of the total mass of the trailer 132 on the trailer axle assembly 134. In one non-limiting embodiment, various instances of $m_w$ may be determined, such as for example, a separate $m_w$ for a support structure for each axle, or each wheel. It is envisioned that quantification of $m_0$ and $m_w$ may be determined by:

$$m_0 = N\int_{x_f}^{x_r} (x_w - x)\rho(x)dx \qquad \text{Equation 4}$$

$$m_w = m - m_w = N\int_{x_f}^{x_r} (x)\rho(x)dx \qquad \text{Equation 5}$$

Summing the above, $m_w$ and $m_0$ for a total mass as follows:

$$m = m_0 + m_w = x_w N\int_{x_f}^{x_r} \rho(x)dx \qquad \text{Equation 6}$$

Thus:

$$N = \frac{1}{x_w} \qquad \text{Equation 7}$$

Combining equations 4 and 5 provides $m_0$:

$$m_0 = m\left(1 - \frac{x_c}{x_w}\right) \qquad \text{Equation 8}$$

Solving for $x_c$:

$$x_c = x_w\left(1 - \frac{m_0}{m}\right) \quad \text{Equation 8}$$

For a detailed description of exemplary systems and methods for determining a mass density distribution, a total mass of a trailer, and center of mass, reference can be made to U.S. patent application Ser. No. 18/235,787 by Riviero et al., previously incorporated by reference in its entirety hereinabove.

With the total masses and total mass density distribution for each of the autonomous vehicle 100 and the loaded trailer 132 determined, the weight-on-axle for each of the three axles (e.g., the first axle 104, the rear axle 110, and the trailer axle 136) may be determined. As described hereinabove, the autonomy computing system 200 utilizes at least the mass density distribution 710 of the autonomous vehicle 100, the trailer axle load 316, the kingpin load 314, and the wheelbase 144 of the rig 130 to determine or otherwise calculate a center of mass load 702, and its location, on the rig 130. The autonomy computing system 200 uses the center of mass load 702 to identify or otherwise calculate a first axle load 704, a rear axle load 706, and the trailer axle load 708. As can be appreciated, trailer handling is dependent upon a moment of inertia of the trailer 132. A load 150 that is concentrated about a center of mass 702 will have handling characteristics that are different from a distributed load 910 of the same mass. To ensure the safe and proper transportation of the trailer 132 and its associated load 150, a moment of inertia for the trailer is determined by the autonomy computing system 200 during or after the brief driving maneuver. In embodiments, the moment of inertia, $I_0$, for the trailer 132 may be defined as:

$$I_0 = \int_{x_f}^{x_r} x^2 \rho(x)dx \quad \text{Equation 10}$$

Alternatively, the moment of inertial $I_0$ may be defined by applying the parallel axis theorem:

$$I_0 = mx_c^2 \int_{x_f}^{x_r} (x - x_c)^2 \rho(x)dx \quad \text{Equation 11}$$

The autonomy computing system 200 may bound the moment of inertia $I_0$ between a minimum (e.g., for example, a mass density centered locally on the center of mass); that is:

$$\frac{\min(I_0)}{\rho(x)} = mx_c^2 \quad \text{Equation 12}$$

Alternatively, the moment of inertia $I_0$ may be bound using a maximum (e.g., for example, a mass density including half of a load at a smaller of $(x_c - x_f)$ or $(x_r - x_c)$:

$$\frac{\max(I_0)}{\rho(x)} = m\left(x_c^2 + \min(\{x_c - x_f, x_r - x_c\})^2\right) \quad \text{Equation 12}$$

For a detailed description of exemplary systems and methods for determining a moment of inertia of a trailer, reference can be made to U.S. patent application Ser. No. 18/235,787 by Riviero et al., previously incorporated by reference in its entirety hereinabove.

In operation, the autonomy computing system 200 compares the determined first axle load 704, rear axle load 706, and trailer axle load 708 to predetermined threshold values corresponding to maximum legal axle loads and/or legal weight distribution values. If one or more of the determined first axle load 704, rear axle load 706, or trailer axle load 708 are equal to or below the predetermined threshold values, the autonomous vehicle 100 proceeds to a weigh station to be weighed and approved for transit. If one or more of the determined first axle load 704, rear axle load 706, or trailer axle load 708 exceeds the predetermined threshold values, the autonomy computing system 200 determines if one or both of the fifth wheel hitch 300 or the trailer axle assembly 134 may be adjusted within their maximum limits to correct the weight-on-axle loading of the first axle 104, the rear axle 110, and the trailer axle 136. If the autonomy computing system 200 determines that it is possible to correct the weight-on-axle loading using one or both of the fifth wheel hitch 300 or the trailer axle assembly 134, the autonomy computing system alerts an operator to adjust the position of one or both of the fifth wheel hitch 300 or the trailer axle assembly 134. In embodiments, the autonomy computing system 200 may alert or otherwise instruct a user to adjust the fifth wheel hitch 300 or trailer wheel assembly 134 to a position that corrects the weight-on-axle loading. It is envisioned that the position of the fifth wheel hitch 300 and/or the trailer axle assembly 134 may be manually adjusted or automatically adjusted via one or more actuators and/or sensors associated with the fifth wheel hitch 300. For a detailed description of exemplary fifth-wheel hitches and manual and/or automated management thereof, reference can be made to U.S. patent application Ser. No. 18/235,330 by Fox-Rabinovitz et al., previously incorporated by reference in its entirety hereinabove. With the fifth wheel hitch 300 and/or trailer axle assembly 134 adjusted to the desired position, the autonomy computing system instructs the autonomous vehicle to re-perform the brief driving maneuver and recalculate the weight-on-axle loading for the rig 130.

If the autonomy computing system 200 determines that it is not possible to correct the weight-on-axle loading using one or both of the fifth wheel hitch 300 or the trailer axle assembly 134, the autonomy computing system 200 determines if the total mass of the rig 130 exceeds a predetermined threshold value corresponding to a legal maximum total mass for the rig 130. If the autonomy computing system 200 determines that the total mass of the rig 130 exceeds the predetermined threshold value, the autonomy computing system 200 issues an alert recommending that a portion of the cargo 150 be unloaded from the trailer 132 and instructs the autonomous vehicle 100 to return to the customer to unload the recommended amount of cargo 150. If the autonomy computing system 200 determines that the total mass of the rig 130 does not exceed the predetermined threshold value, the autonomy computing system 200 issues an alert recommending that the cargo 150 be redistributed within the trailer 132 and instructs the autonomous vehicle 100 to return to the customer to redistribute the cargo 150 in the recommended manner. As can be appreciated, portions of, or the entirety, of the above-described operation may be repeated as many times as necessary to achieve a legal weight-on-axle loading without departing from the scope of the disclosure.

Figure 12A:
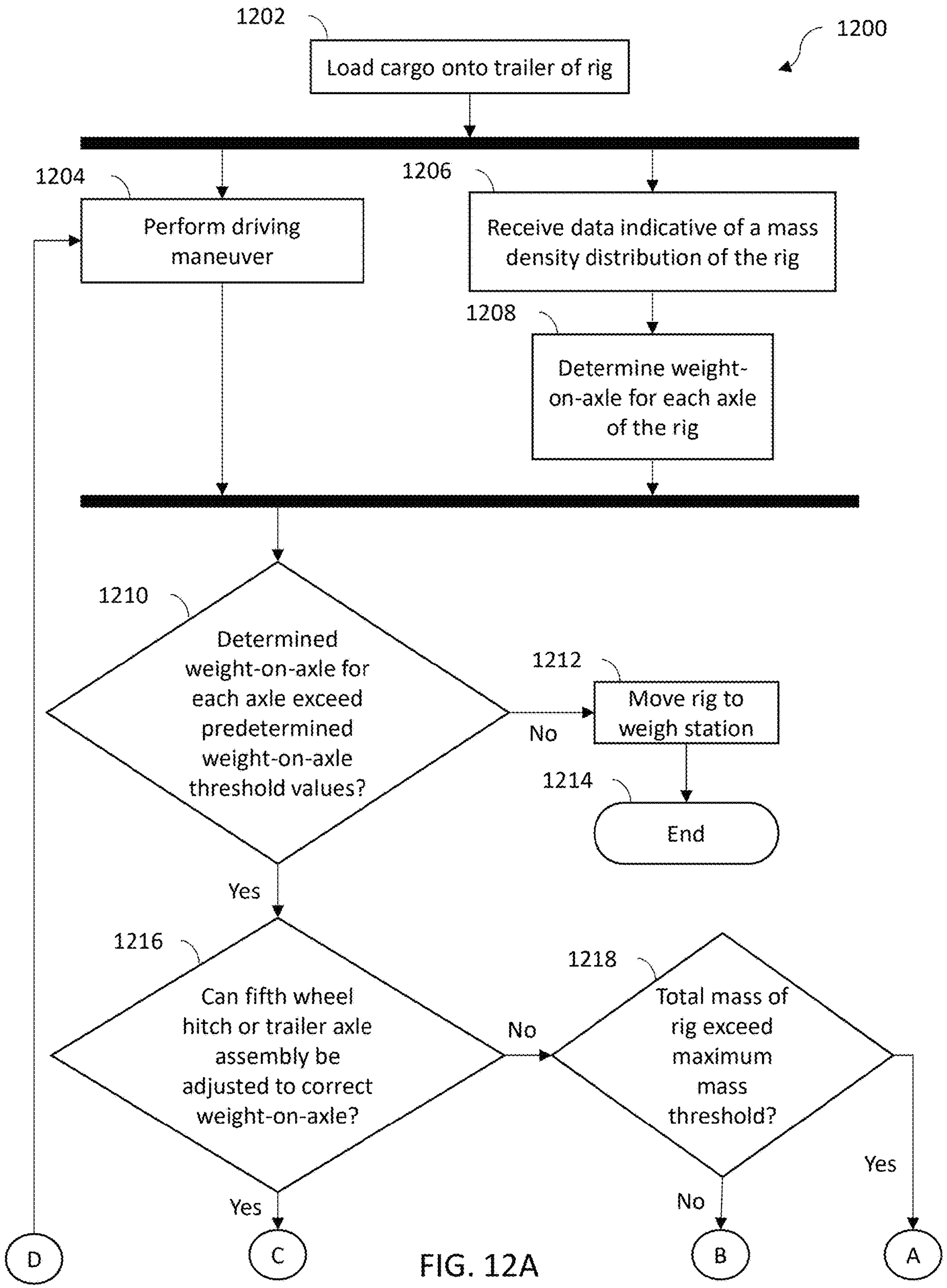
FIG. 12A is a flow diagram illustrating a method of determining a weight-on-axle of the rig of FIG. 1 in accordance with the disclosure.
Figure 12B:
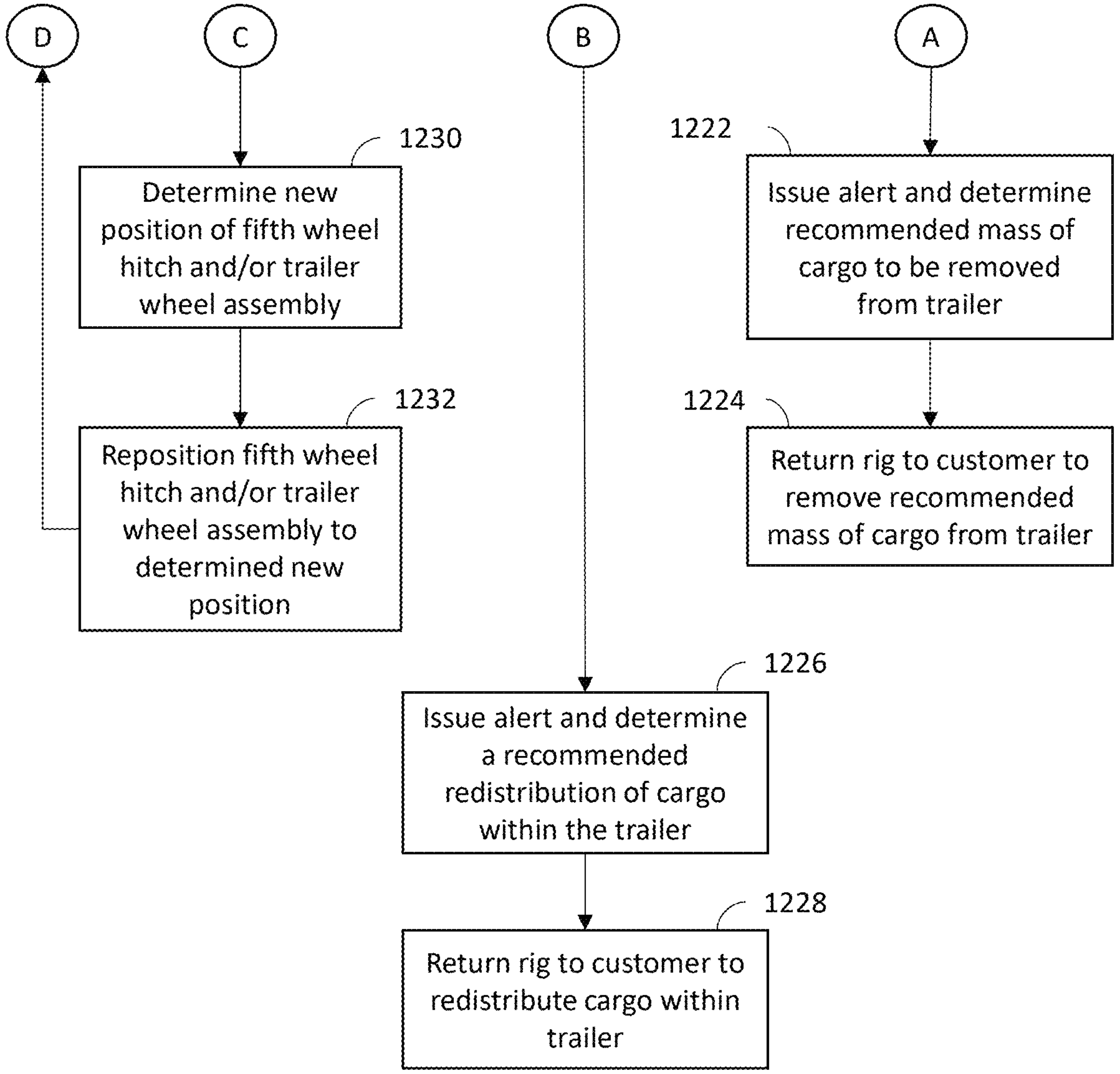
FIG. 12B is a continuation of the flow diagram of FIG. 12A.

With reference to FIGS. 12A and 12B, a method of monitoring a trailer load is described and generally indicated by reference numeral 1200. Cargo is loaded 1202 onto a trailer of a rig formed of a vehicle and the trailer and the loaded rig performs a driving maneuver 1204, which may be over a short distance or over a short period of time. During the driving maneuver, a controller of the vehicle receives data indicative of a mass density distribution of the rig 1206 and the controller determines a weight-on-axle for each axle of the rig 1208. The determined weight-on-axle for each axle of the rig is compared 1210 to respective predetermined weight-on-axle threshold values and it is determined if weight-on-axle for each axle exceeds predetermined weight-on-axle threshold values. If the determined weight-on-axle for each axle of the rig does not exceed the respective predetermined weight-on-axle threshold value, the rig is moved 1212 to a weigh station to be weighed and the method ends 1214. If one or more of the determined weight-on-axles exceeds a respective predetermined weight-on-axle threshold value, it is determined 1216 if a position of one or both of the fifth wheel hitch or trailer axle assembly may be adjusted to correct the total mass density distribution of the rig. If it is determined that the fifth wheel hitch or trailer axle assembly cannot be adjusted to correct the total mass density distribution of the rig, it is determined 1218 if the total mass of the rig exceeds a predetermined maximum mass threshold. If it is determined that the total mass of the rig exceeds the predetermined maximum mass threshold, an alert is issued and a recommended mass of cargo to be removed is determined 1222, and the rig is returned 1224 to the customer to remove the recommended mass of cargo. If it is determined that the total mass of the rig does not exceed the predetermined maximum mass threshold, an alert is issued and a recommended redistribution of the cargo is determined 1226, and the rig returns 1228 to the customer to redistribute the cargo within the trailer in accordance with the recommendation. If it is determined if the fifth wheel hitch or trailer axle assembly may be adjusted to correct the total mass density distribution of the rig, a new position for one or both of the fifth wheel hitch or trailer axle assembly is determined 1230. The fifth wheel and/or trailer axle assembly is repositioned 1232 to the determined new position and the rig again performs the driving maneuver 1204. As can be appreciated, the above-described method may be performed in any order and any number of times without departing from the scope of the disclosure.

Figure 13:
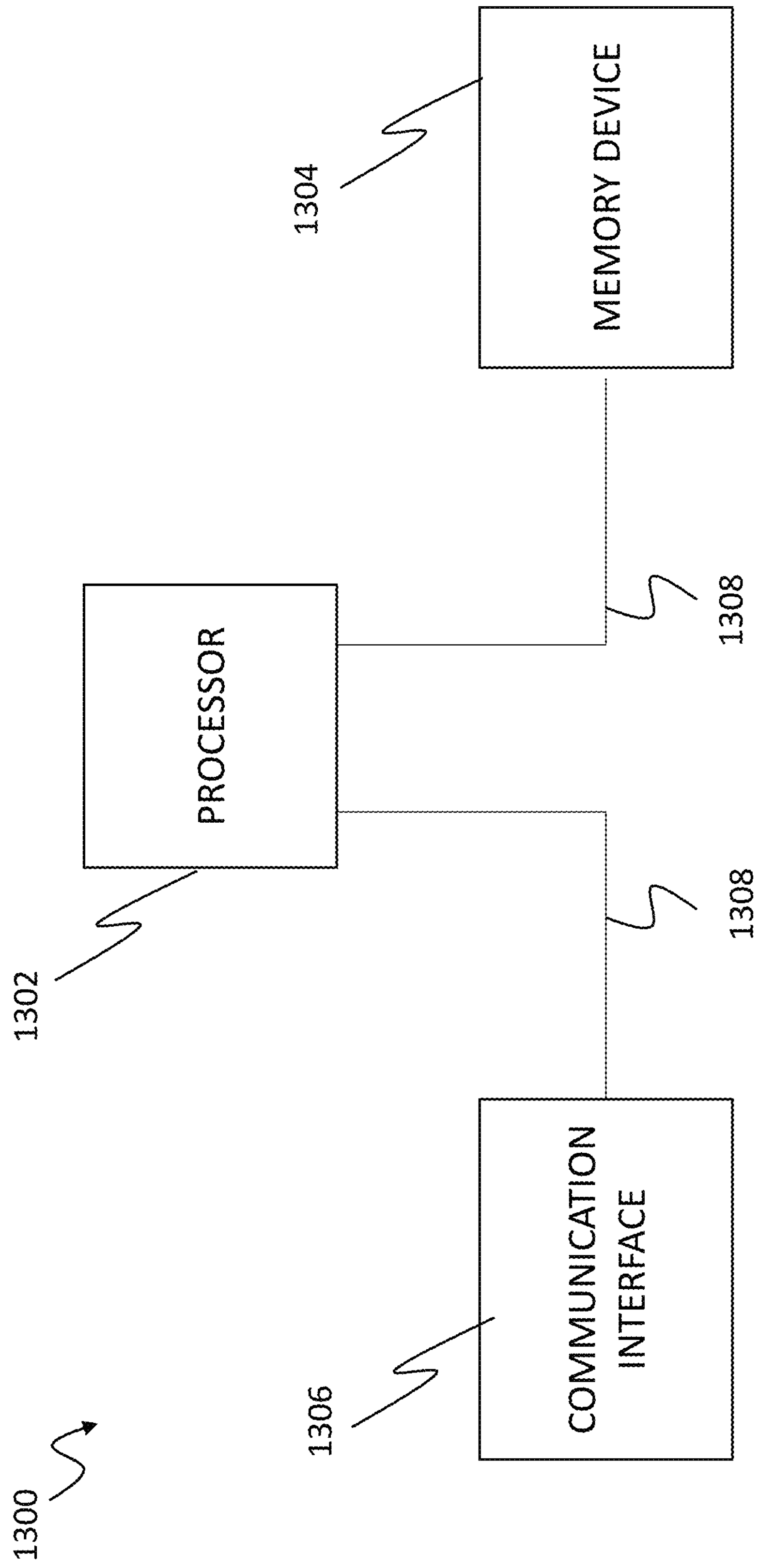
FIG. 13 is a block diagram of a processing system for implementation of embodiments of the disclosure.

Turning to FIG. 13, a schematic block diagram of a computing device for implementation of embodiments of the disclosure is illustrated and generally identified by reference numeral 1300. Methods described herein may be implemented with one or more computing devices 1300. The computing device 1300 includes a processor 1302 and a memory device 1304. The processor 1304 is coupled to the memory device 1304 via the system bus 1308. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are examples only, and thus are not intended to limit in any way the definition or meaning of the term "processor."

The processor 1302 may be operatively coupled to a communication interface 1306 such that the computing device 1300 is capable of communicating with another device, such as for example, a remote application server, user equipment, a mobile device, a smart vehicle, a mission control or a central hub, another processing system, for example, using wireless communication or data transmission over one or more radio links or digital communication channels using one or more of a Wi-Fi protocol, an RFID protocol, or a Near-Field Communication (NFC) protocol, as one-way communication or two-way communication, or combinations thereof.

In the example embodiment, the memory device 1304 includes one or more devices that enable information, such as executable instructions or other data (e.g., sensor data), to be stored and retrieved. Moreover, the memory device 1304 includes one or more computer readable media, such as, without limitation, dynamic random-access memory (DRAM), static random-access memory (SRAM), a solid-state disk, or a hard disk. In the example embodiment, the memory device 1304 stores, without limitation, application source code, application object code, configuration data, additional input events, application states, assertion statements, validation results, or any other type of data. The computing device 1300, in the example embodiment, may also include a communication interface 1306 that is coupled to the processor 1302 via the system bus 1308. Moreover, the communication interface 1306 is communicatively coupled to data acquisition devices.

In the example embodiment, the processor 1302 may be programmed by encoding an operation using one or more executable instructions and providing the executable instructions in the memory device 1304. In the example embodiment, the processor 1302 is programmed to select a plurality of measurements that are received from data acquisition devices.

In operation, a computer executed computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and in embodiment of the disclosure may include additional or fewer operations than those disclosed herein. For example, it is contemplated that executing or performing a particular operation before, contemporaneously with, or after another operation is within the scope of aspects of the disclosure.

In embodiments, the memory device 1304 may be external to the computing device 1300 and may be accessed by using a storage interface or the system bus 1308. For example, the memory device 608 may include a storage area network (SAN), a network attached storage (NAS) system, or multiple storage units such as, for example, hard disks and solid-state disks in a redundant array of inexpensive disks (RAID) configuration.

In some embodiments, the processor 1302 may be operatively coupled to the memory device 1304 via the system bus 1308. It is envisioned that the system bus 1308 may be any component capable of providing the processor 1302 with access to the memory device 1304. In embodiments, the system bus 1308 may include, for example, an Advanced Technology Attachment (ATA) adapter, a Serial ATA (SATA) adapter, a Small Computer System Interface (SCSI) adapter, a RAID controller, a SAN adapter, a network adapter, or any component providing the processor 1302 with access to the memory device 1304.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware may be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomous vehicle selectively coupled to a load, comprising:

at least one sensor configured to capture signals of an autonomous vehicle; and an autonomy computing system operably coupled to the at least one sensor, the autonomy computing system comprising at least one processor and at least one memory device, the at least one processor programmed to:

cause the autonomous vehicle to execute a driving maneuver;

receive the signals from the at least one sensor as the autonomous vehicle coupled to the load is executing the driving maneuver;

determine, using the signals received from the at least one sensor, a center of mass defined by the load coupled to the autonomous vehicle;

determine, based on the determined center of mass, a weight-on-axle for each axle of a plurality of axles supporting the autonomous vehicle and the load;

determine if the determined weight-on-axle for each of axle exceeds predetermined maximum weight-on-axle values to determine if the center of mass requires adjustment; and in response to determining, for at least one axle, the weight-on-axle exceeds a corresponding one of the predetermined maximum weight-on-axle values, issue a recommendation for adjusting the center of mass to cause the weight-on-axle for each axle to be less than the predetermined maximum weight-on-axle values before weighing the autonomous vehicle and the load on a scale.

2. The autonomous vehicle according to claim 1, wherein the at least one processor is further programmed to:

determine a total mass of the load based on the signals received from the at least one sensor as the autonomous vehicle coupled to the load is executing the driving maneuver.

3. The autonomous vehicle according to claim 2, wherein the at least one processor is further programmed to:

determine, if the total mass of the load that is supported by the autonomous vehicle requires adjustment, a recommended reduction in a mass of the load that causes the weight-on-axle of each of the plurality of axles to be less than the predetermined maximum weight-on-axle values.

4. The-autonomous vehicle according to claim 3, wherein the at least one processor is further programmed to:

determine, if the total mass of the load that is supported by the autonomous vehicle requires adjustment, a recommended redistribution of a cargo of the load that causes the weight-on-axle of each of the plurality of axles to be less than the predetermined maximum weight-on-axle values.

5. The autonomous vehicle according to claim 1, wherein the autonomous vehicle further includes:

a fifth wheel hitch configured to selectively engage and support the load on the autonomous vehicle.

6. The autonomous vehicle according to claim 5, wherein the at least one processor is further programmed to:

determine, if the center of mass of the load requires adjustment, a position of the fifth wheel hitch on the autonomous vehicle that causes the weight-on-axle of each axle of the plurality of axles to be less than the predetermined maximum weight-on-axle values before weighing the autonomous vehicle and the load on the scale.

7. The autonomous vehicle according to claim 6, wherein the fifth wheel hitch is selectively adjustable relative to the autonomous vehicle, wherein the at least one processor is further programmed to:

adjust the fifth wheel hitch to the determined position on the autonomous vehicle.

8. The autonomous vehicle according to claim 6, wherein the at least one processor is further programmed to:

issue an alert including a recommendation for the determined position of the fifth wheel hitch on the autonomous vehicle.

9. The autonomous vehicle according to claim 1, wherein the at least one processor is further programmed to:

determine a type of load coupled to the autonomous vehicle based on the signals received from the at least one sensor as the autonomous vehicle coupled to the load is executing the driving maneuver.

10. The autonomous vehicle according to claim 1, wherein an axle supporting the load is selectively adjustable relative to the load, wherein the at least one processor is further programmed to:

determine, if the center of mass of the load requires adjustment, a position of the axle supporting the load that causes the weight-on-axle of each axle of the plurality of axles to be less than the predetermined maximum weight-on-axle values before weighing the autonomous vehicle and the load on the scale.

11. A computer-implemented method of monitoring a trailer load of an autonomous vehicle, comprising:

performing a driving maneuver with an autonomous vehicle coupled to a load, wherein the autonomous vehicle coupled to the load includes a plurality of axles;

receiving signals from at least one sensor of the autonomous vehicle as the autonomous vehicle is performing the driving maneuver;

determining, using the received signals, a center of mass defined by the load coupled to the autonomous vehicle;

determining, based on the determined center of mass, a weight-on-axle for each axle of the plurality of axles;

determining if the determined weight-on-axle for each axle exceeds predetermined maximum weight-on-axle values to determine if the center of mass requires adjustment; and in response to determining, for at least one axle, the weight-on-axle exceeds a corresponding one of the predetermined maximum weight-on-axle values, issue a recommendation for adjusting the center of mass to cause the weight-on-axle for each axle to be less than the predetermined maximum weight-on-axle values before weighing the autonomous vehicle and the load on a scale; and adjusting a fifth wheel hitch of autonomous vehicle to a determined position on the autonomous vehicle.

12. The computer-implemented method according to claim 11, further comprising determining a total mass of the load based on the received signals as the autonomous vehicle coupled to the load is executing the driving maneuver.

13. The computer-implanted method according to claim 12, further comprising determining, if the total mass of the load that is supported by the autonomous vehicle requires adjustment, a recommended reduction in a mass of the load that causes the weight-on-axle of each of the plurality of axles to be less than the predetermined maximum weight-on-axle values.

14. The computer-implemented method according to claim 13, further comprising determining, if the total mass of the load that is supported by the autonomous vehicle requires adjustment, a recommended redistribution of a cargo of the load that causes the weight-on-axle of each of the plurality of axles to be less than the predetermined maximum weight-on-axle values.

15. The computer-implemented method according to claim 11, wherein performing the driving maneuver includes performing the driving maneuver with the load selectively engaged with and supported by a fifth wheel hitch of the autonomous vehicle.

16. The computer-implemented method according to claim 15, further comprising, determining, if the center of mass requires adjustment, a position of the fifth wheel hitch on the autonomous vehicle that causes the weight-on-axle of each axle of the plurality of axles to be less than the predetermined maximum weight-on-axle values before weighing the autonomous vehicle and the load on the scale.

17. The computer-implemented method according to claim 16, further comprising issuing an alert including a recommendation for the determined position of the fifth wheel hitch on the autonomous vehicle.

18. The computer-implemented method according to claim 11, further comprising determining a type of load coupled to the autonomous vehicle based on the received signals as the autonomous vehicle coupled to the load is executing the driving maneuver.

19. The computer-implemented method according to claim 11, further comprising determining, if the center of mass of the load requires adjustment, a position of an axle of the plurality of axles supporting the load that causes the weight-on-axle of each axle to be less than the predetermined maximum weight-on-axle values before weighing the autonomous vehicle and the load on the scale.

* * * * *